United States Patent

[11] 3,593,369

[72] Inventors A. D. Anderson
Sioux City;
Walter E. Lauridsen, South Sioux City;
Charles L. Overstreet, Sioux City, all of,
Iowa
[21] Appl. No. 706,557
[22] Filed Feb. 19, 1968
[45] Patented July 20, 1971
[73] Assignee Iowa Beef Processors, Inc.

[54] METHOD OF BREAKING ANIMAL CARCASSES AND HANDLING MEAT PRODUCTS
44 Claims, 14 Drawing Figs.
[52] U.S. Cl. .................................................... 17/46, 17/1 G
[51] Int. Cl. ........................................................ A22c 17/00
[50] Field of Search........................................... 17/1, 24, 44, 44.1, 45, 46

[56] References Cited
UNITED STATES PATENTS
| 1,971,460 | 8/1934 | McKee | 17/44 X |
| 2,551,155 | 5/1951 | Orling | 17/24 X |
| 2,883,700 | 4/1959 | Liebmann, Jr. | 17/24 |
| 3,234,591 | 2/1966 | Vogt et al. | 17/45 |

FOREIGN PATENTS
| Des.1,136,237 | 9/1962 | Germany | 17/1 |

Primary Examiner—Lucie H. Laudenslager
Attorney—Beveridge & DeGrandi

ABSTRACT: An integrated facility for breaking dressed animal carcasses includes a continuous flow of the carcasses and their subdivisions through a series of processing areas where the carcasses are broken into primal cuts, the primal cuts are further divided, boned and trimmed along processing lines designated for particular cuts, the secondary cuts thus produced are then trimmed and boned as necessary, packaged and sorted according to their weight. Groups of the secondary cuts are placed in boxes which carry machine-readable markings which indicate the box contents. The filled receptacles are carried by a common conveyor to an area where they are sorted into groups according to the machine-readable markings, palletized by groups and placed on unidirectional refrigerated storage conveyors. Orders for products are filled by discharging the pallets from their respective storage conveyors, depalletizing the goods and routing the boxes to designated transport vehicles. A constant inventory of boxed products is maintained by automatically reading the markings on the boxes and weighing the boxes both before and after they pass through the storage conveyors. Large bodies of meat are advanced through a series of stations where subportions thereof are removed and deposited on conveyorized lines which are provided with work stations and tables specially arranged for processing the particular subportion, for example a primal cut.

Suspended carcasses are broken into primal cuts by moving them through a series of stations where portions are removed. Large portions such as forequarters of beef are transferred to a conveyor which suspends them from a pair of tongs. Beef chucks may be supported on a looped cord which passes therethrough as they are severed from the carcass. Other portions may be removed by cutting them from the carcass and permitting them to fall at the head of a conveyor which has stations therealong for cutting, trimming, packaging and weighing meat.

Tongs for suspending the meat have a pair of opposed relatively movable plates which engage opposite sides of the meat.

A method and apparatus for releasing portions of meat suspended from cords which are engaged on hooks involves movement of a pair of members toward and beyond each other, whereby one member acts as an abutment to hold the hook in a desired orientation and the other member pushes the cord and the meat from the hook.

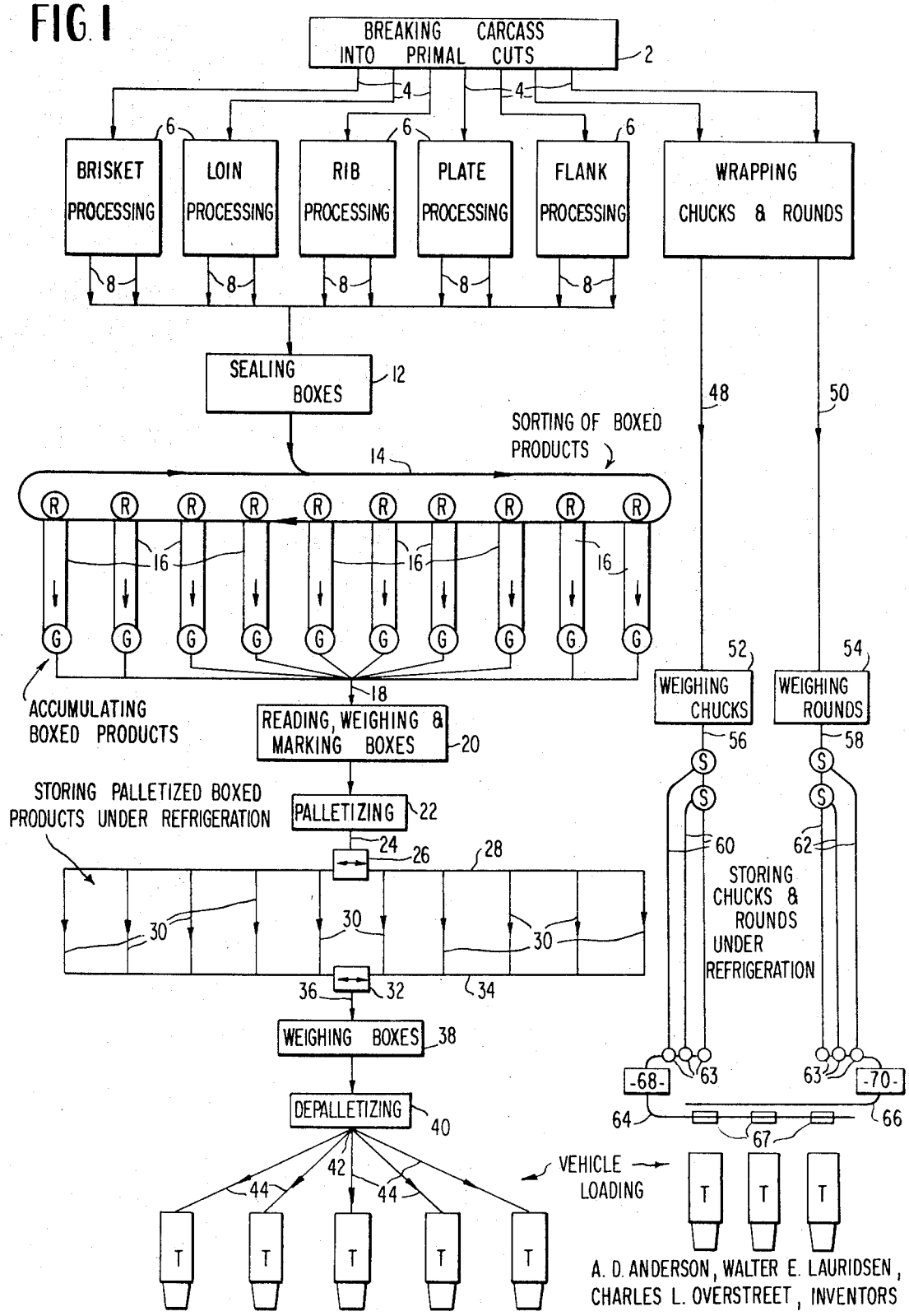

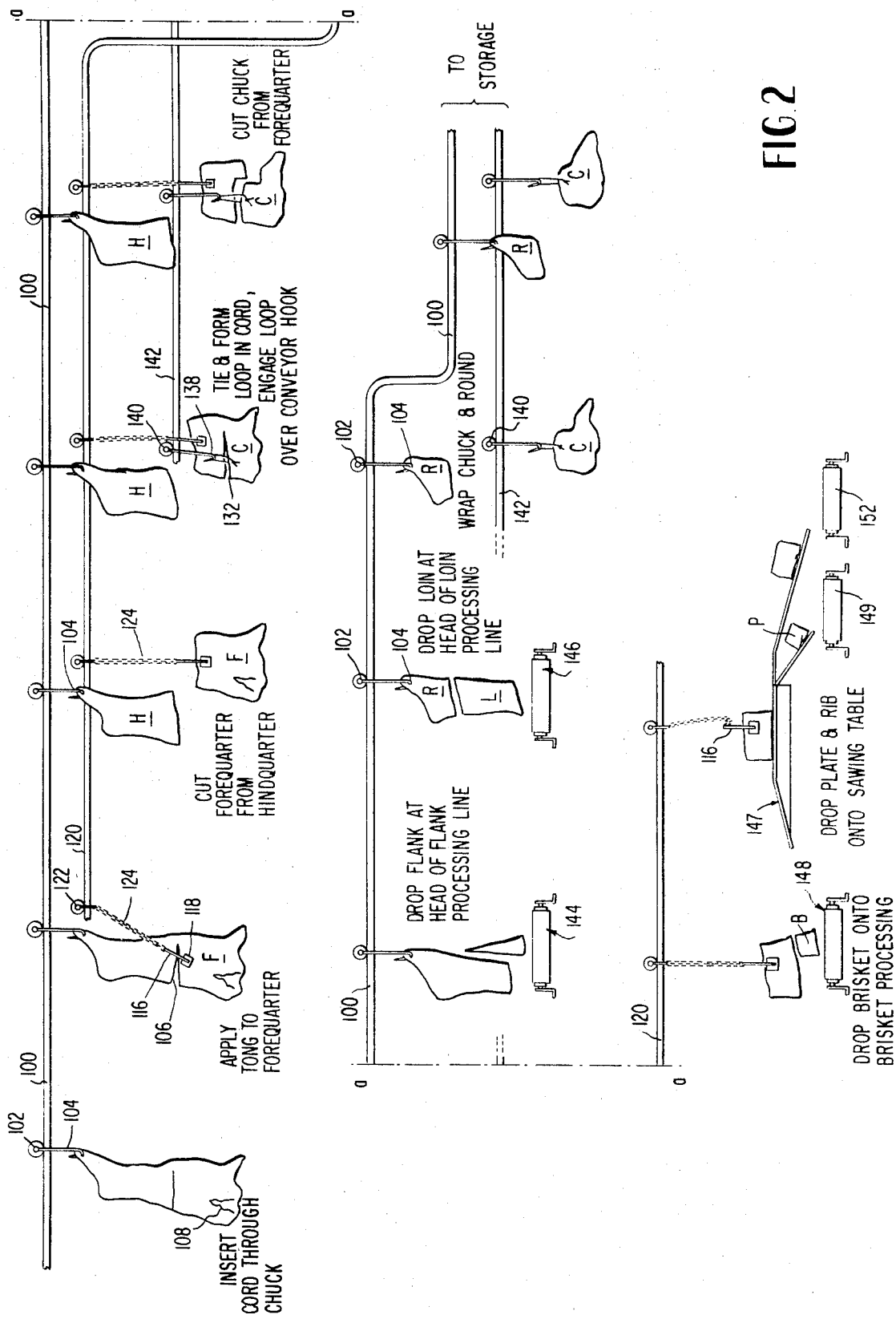

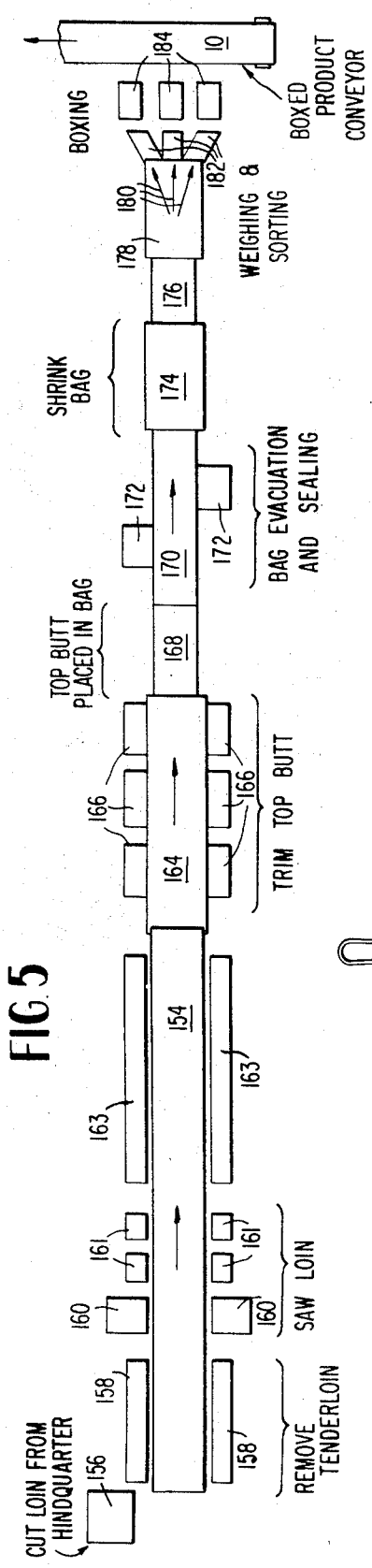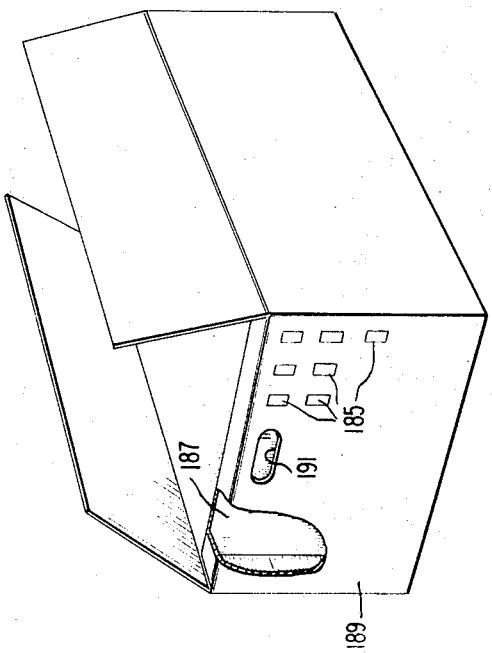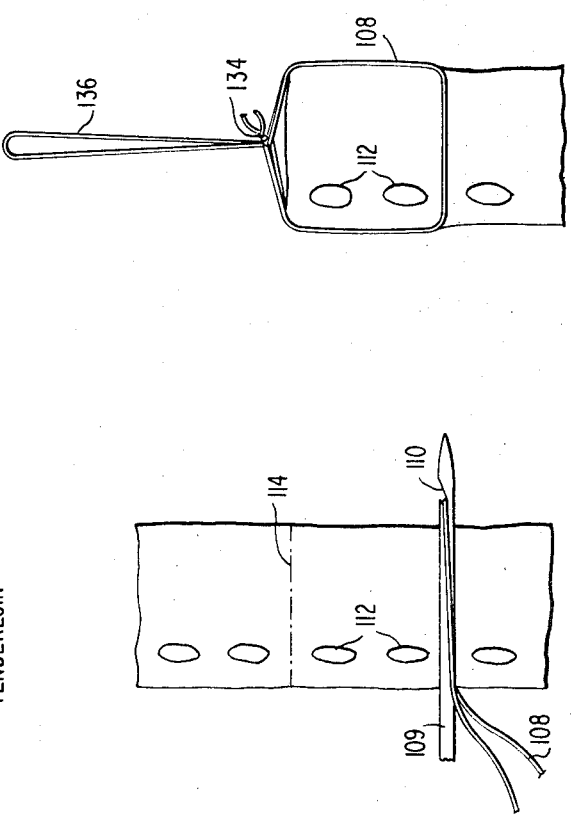

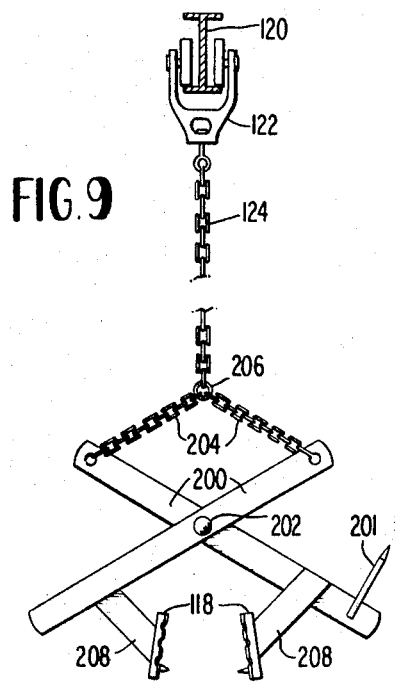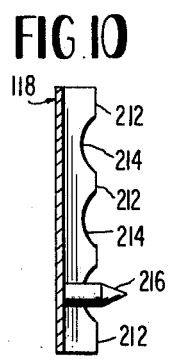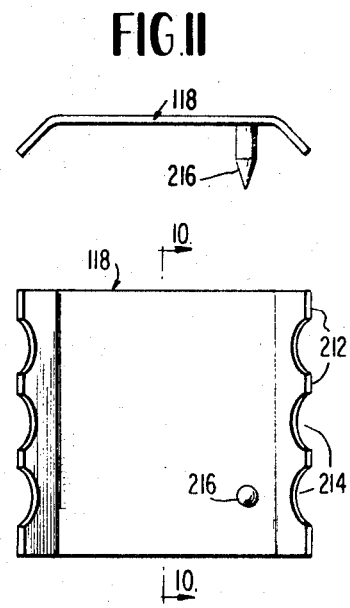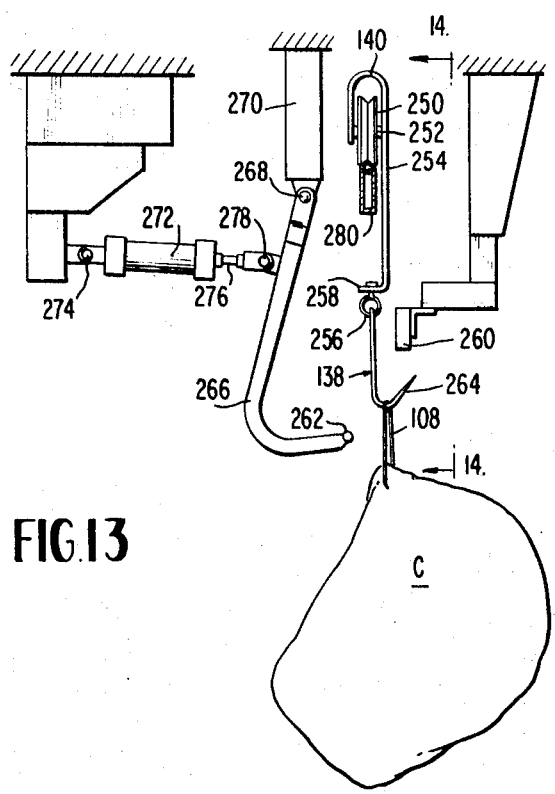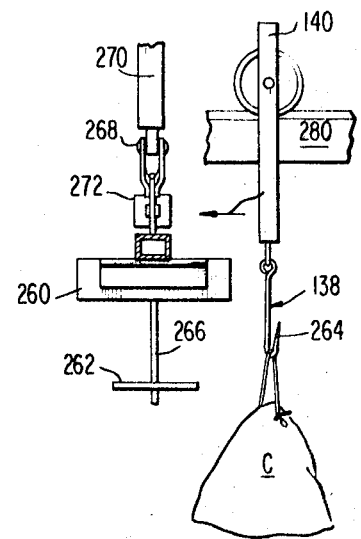

METHOD OF BREAKING ANIMAL CARCASSES AND HANDLING MEAT PRODUCTS

BACKGROUND OF INVENTION

This invention is directed to methods and apparatus utilized in the meatpacking industry for breaking carcasses, processing the cuts obtained from the breaking operations, and handling the meat as it passes through the various stages of such an operation.

In the meat industry, and particularly in those areas devoted to the processing of beef, it has been customary for the meat-packer to slaughter the animals, dress them and then ship the carcasses, in the form of sides or quarters, to a purveyor or to a retailer who then subdivides it into consumer cuts which are marketable to the public or the restaurant trade.

Utilizing previous techniques, the cost of shipping the dressed carcasses inherently involves payment of a shipping charge for undesired and inedible portions such as bone and fat. Moreover, the relatively inefficient procedure used by small fabricators, purveyors and markets involves a relatively inefficient use of manual labor which is due both to the unnecessary manhandling of the large bodies of meat and to the manner in which various bodies of meat must be routed through such facilities.

The usual procedures for breaking carcasses have, for the most part, been inefficient and require a substantial amount of manual labor for supporting and manipulating the heavy portions of the carcass. An example of this is when a forequarter is removed from a side of beef which is supported on a gambrel or hook. This is usually done by sawing through the carcass as the forequarter is supported by two or more men who then lower it onto a cutting table or carry it to another place where it is to be further fabricated. In some instances, it has been proposed to provide a suspended support for lower portions of the carcass as they are cut; however, these techniques are not adapted to the high-production rate of the carcass breaking facility of this invention.

In the past, overhead conveyor rails have been used in conjunction with beef boning processes wherein boneless cuts of meat are removed from the suspended carcass at work stations along the conveyor, thus leaving the entire skeleton suspended from the rail. According to the present invention, however, portions such as primal cuts which include meat bone and fat are removed from a suspended carcass as it moves along the rail.

The customary method of supporting a large body of meat from an overhead conveyor is to employ a hook which penetrates the meat. Repeated handling of the meat, such as a beef chuck, results in many holes through the meat due to the use of the hooks, thereby damaging the meat to some extent and reducing its marketability. This is avoided by this invention.

SUMMARY OF THE INVENTION

The inventions described in this specification involve an integrated meat-processing facility in which carcasses are broken, packaged and handled en route to a dispatching area; a method of breaking a carcass involving several novel aspects which substantially reduce the labor required to handle the meat; a particular construction of meat-handling tongs useful in the practice of the carcass-breaking operation and in other environments; a method and apparatus for handling bodies of meat using a flexible cord for support of the meat; and, a method and apparatus for ejecting cord-supported bodies of meat from a hook on a conveyor.

The overall facility and the methods employed therein involve an area where carcasses are broken into parts such as primal cuts; processing lines where the primal cuts are, if necessary, boned, trimmed, further subdivided, wrapped, sorted into groups according to their individual weights, and placed in boxes or other receptacles which carry machine-readable indicia; a conveyor which is fed from a plurality of the processing lines and which carries receptacles filled with a number of different products; an area for sorting the receptacles according to the indicia which they carry and then palletizing them, whereafter they are led to designated unidirectional storage lanes in a refrigerated area. The palletized sets of containers may be discharged from the storage lanes, the pallet loads weighed, depalletized and routed to individual transport vehicles at a dispatching area.

The method and apparatus used in breaking a carcass into primal cuts is particularly important because it minimizes the amount of lifting which must be done in the breaking of a carcass. This is done in several ways, all of which are believed to have inventive merit. One method employed is to support a portion of the carcass from a pair of suspended tongs which preferably is mounted on an individual conveyor. The tongs preferably have a pair of plates for contacting the opposite sides of the body of meat without causing substantial penetration of the meat and the consequent damaging thereof. Handling of the meat is also facilitated by moving a large body of meat, a side of beef for example, through a series of stations where portions thereof, primal cuts for example, are removed and deposited at the heads of conveyorized lines which have worktables and stations therealong specially constructed and arranged for processing the particular portion.

Another method which avoids excessive handling of the product includes the insertion of a cord through a portion of the carcass and forming a loop in the cord, and cutting the corded portion from the carcass while supporting it by the cord from a support, preferably another conveyor. The use of a cord in this manner avoids the necessity of placing a number of holes in the meat if it is transferred from one supporting hook to another, and it permits the use of an automatic hook unloading device described below.

Still another manner of avoiding excessive handling is to route the carcass suspended from the main gambrel through a series of stations where some portions including meat, fat and bone such as primal cuts may be cut and released for movement to storage or to further processing areas.

Other significant aspects of the method and apparatus for breaking the carcass into subportions such as primal cuts will be evident from this specification and particularly from the claims hereof.

In another sense, this invention involves a novel meat-supporting pair of tongs which have relatively movable opposed plates for contacting the opposite sides of a large body of meat such as the forequarter. These tongs are provided with a number of small projections, preferably formed by bending a notched edge of the plate toward the other plate, which tends frictionally to retain the body of meat without penetrating it to a substantial extent.

A further phase of the invention relates to the apparatus and method of releasing a cord-supported body of meat from a conveyor hook. This includes a pair of relatively movable members, one of which is horizontally aligned with the shank of the hook and the other of which is horizontally aligned either with the meat or the cord, wherein the relative movement of the members results in the proper orientation of the hook and the release of the cord from the hook.

Other aspects of the invention pertain to an overall system for subdividing a beef carcass into parts, trimming and packaging the parts without lifting the carcass, or any part thereof by any operator; a method of suspending a beef part; and an integrated inventory control system for a beef breaking, fabricating and packaging facility.

Accordingly, it is among the objects of the apparatus and method of this invention to provide an efficient flow of the meat carcasses and their subdivisions through each phase of a facility of this type; to provide a carcass-breaking operation which practically eliminates the manual labor involved in lifting manipulating the meat while breaking a carcass into portions such as primal cuts; to avoid unnecessary damage to the meat due to its suspension from supporting devices; and, to provide an efficient method and apparatus for releasing bodies of meat from hooks.

DESCRIPTION OF THE DRAWINGS

FIG. 1 is a diagrammatic representation of the flow of carcasses and subportions thereof through the facility from which they emerge as boxed products;

FIG. 2 is a schematic view showing the preferred manner of subdividing a beef carcass into primal cuts;

FIG. 5 shows a loin-processing line, foreshortened for convenience of illustration, wherein a beef loin is subdivided into secondary cuts, and certain secondary cuts are trimmed, packaged, weighed and sorted according to their weight;

FIG. 6 illustrates schematically the manner in which a cord may be inserted through a body of meat;

FIG. 7 shows the cord of FIG. 6, arranged to form a loop by which the body of meat may be suspended;

FIG. 8 shows a box suited for machine-readable indicia;

FIG. 9 is an elevation of a pair of meat-supporting tongs for the handling of meat;

FIGS. 10, 11 and 12 are sectional, plan and elevational views of a meat-engaging plate used in the tongs of FIG. 9;

FIGS. 13 and 14 illustrate an apparatus for releasing a cord-supported body of meat from a conveyor hook.

DESCRIPTION OF PREFERRED EMBODIMENTS

Figure 4:
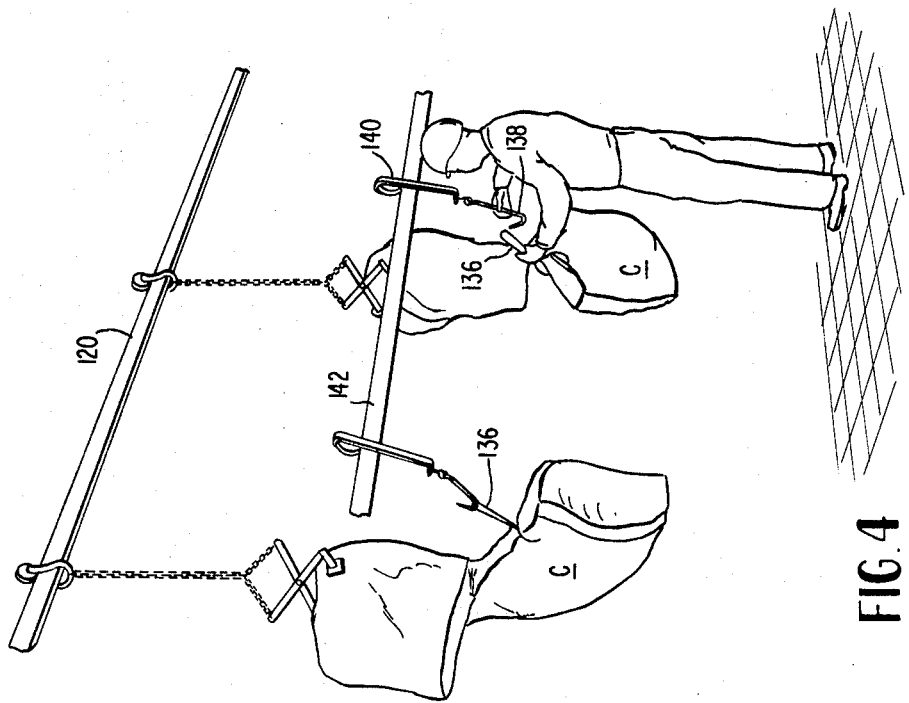
FIG. 4 shows that portion of a beef-breaking facility where the chucks are supported on conveyor hooks by cords, preparatory to their being totally severed from the remainder of the forequarter.

This description which pertains only to the illustrated and preferred embodiments is intended to be representative only and is susceptible to numerous modifications, variations and substitutions which fall within the broad conceptual areas defined in the claims.

Overall Facility

The flow pattern of the carcasses and the meat products derived therefrom is illustrated in FIG. 1 wherein the carcasses enter at the top and exit in the form of chucks, rounds, or boxed products at the loading docks at the lower end of this drawing.

Very briefly, the flow involves movement of the carcasses such as sides of beef through an initial carcass-breaking step 2 where they are subdivided into smaller bodies such as primal cuts which then move along the flow lines 4 to areas where further work is performed on them. In the instance of the chuck and round, the only further work involves the wrapping of the products and routing them to the storage lanes in a refrigerated area. Other primal cuts such as the plate, rib, flank, loin or brisket are processed at 6 where they may be further subdivided, boned, trimmed, wrapped, weighed and boxed. The details of a typical processing line 6 are described in connection with FIG. 5 in a later portion of the specification.

In the course of its movement through one of the processing operations at 6, the primal cut is reduced to a number of smaller consumer cuts. For example, the loin is discharged from its processing line in the form of the top butt, bottom butt, New York strip, and tenderloin. Some or all of these consumer cuts may, at the end of the processing line, be sorted into groups according to their weight and then placed in boxes which carry machine-readable indicia and enclose a particular type of consumer cut falling within certain weight ranges.

A single processing line may discharge several different products. For example, a loin-processing line might produce 12 products, there being four types of consumer cuts produced and three weight ranges for each cut. For purposes of convenience, only two boxed-product flow lines 8 are shown emerging from each of the processing lines 6, resulting in 10 different boxed products.

The boxed products pass on a common conveyor 10 through a device 12 which closes the flaps on the box and secured the flaps in a closed position by an adhesive or mechanical fasteners.

After the boxes are sealed, they enter a closed conveyor loop 14, along which are a number of reading devices R which are capable of sensing the machine-readable indicia on the boxes. Such devices are well known and may operate in a number of manners, one of which is described in U.S. Pat. No. 3,144,926.

When a box passes the reading device R which is programed to emit a signal upon a passage of a box intended for the adjacent storage lane 16, a ram or other mechanism pushes the box from the sorting lane 14 into the appropriate temporary storage lane 16. In the event that any of the storage lanes 16 are filled so they cannot receive additional boxes, the boxes are recycled and passed again around the loop 14 until space is available in their respective storage lane.

When any of the storage lanes 16 becomes filled with a predetermined number of boxes which will constitute a pallet load, the gate G at the discharge end of that storage lane is opened and the boxes thereon are routed to a lane 18 which leads first to a case weigher and marker 20 where the cases are individually weighed, their contents noted by a device which reads the machine-readable indicia thereon, and impressed with a printing stamp which indicates its weight. Then, the cases are led to the palletizer 22 where they are assembled on a pallet in stacked rows. Typical palletizers are shown by U.S. Pat. Nos. 2,979,872 and 3,050,199. The pallet and the cases are then led by a transfer conveyor 24 into a tower 26 which is a pallet-elevating device which is capable of traversing along a track 28 and transferring pallet loads to the refrigerated storage lanes 30. The movements of the tower 26 may be programed from a device which reads the markings on any one of the boxes in a pallet load. In order to provide a most efficient use of the floor space, the lanes 30 may be vertically tiered, as well as being horizontally displaced apart.

Another function of the inventory control procedures is to account strictly for all of the meat and byproducts in order to avoid pilferage. This is accomplished by weighing the carcasses before they are broken and weighing the unboxed byproducts of the operation. This data, together with the data obtained by weighing the filled boxes, chucks and rounds, is telemetered to a central point where it is analyzed to insure that the weight of the incoming carcasses is equal to that of the outgoing products and byproducts, with some allowance being made for shrinkage.

Due to the case-handling procedure described above, it will be appreciated that those cases which left one of the lanes 8 at the discharge of the processing line 6 will share a single lane 16 prior to entering the palletizer 22, and a single lane 30, while on their respective pallets.

Orders are filled from the storage lanes 30 by sending a signal to the tower 32 which is constructed similarly to the tower 26 so that it may ride along the track 34 to receive palletized loads from any of the storage lanes 30. The tower 32 discharges pallets to the line 36 which carries them to the weigher 38 and the depalletizer 40. At the weigher, there is another device for reading the markings on the boxes. Data so obtained by this reading and weighing is telemetered to a control point where it is used by data processing equipment for accounting, inventory control and billing. Individual cartons then move to a junction 42 where they are routed to any one of five vehicle-loading conveyors 44, each of which leads to an individual transport vehicle such as a truck.

A running inventory is maintained on the boxed product by constantly receiving signals regarding the nature of the products and their weights from the stations 20 and 38. A visual totalizing board may be used to represent the inventory of goods between these points.

Unlike the products which move through the processing lines 6, the chucks and rounds are moved on the trolleys of overhead conveyors into a wrapping area 46 where they are individually wrapped in paper or a knit stockinet.

The trolleys which carry the chucks and rounds are preferably supported on a power and free system whereby the power rails with conventional driving dogs are used to advance the trolleys positively along the lanes 4 to the chuck and round wrapping area. The chucks and rounds then move on the rails 48 and 50 to weighing devices 52 and 54. The weighers 52 and 54 emit a signal which throws a particular one of the switches S, depending upon the weight range of the particular chuck or round. Therefore, the chucks or rounds move on the rails 56 and 58 until they are diverted into selective ones of the chuck storage rails 60 or round storage rails 62, wherein each rail 60, 62 will support cuts falling within designated weight ranges. The rails 60 and 62 are slightly inclined downwardly away from the switches S so that the chucks and rounds will advance therealong solely under the influence of gravity. Orders for chucks and rounds are filled by automatically opening any one of the gates 63 to release the trolleys onto a power rail 64 or 66 which then passes the product along a vehicle-loading area where trucks T may be located. Weighing devices 68 and 70 are located along the rails 64 and 66. Unloading devices 67 of the type illustrated in FIGS. 13 and 14 may be located along the chuck-conveying rail at the individual truck docks.

Inventory control of chucks and rounds is similar to that employed for the boxed products. The weighing devices 52, 54, 68, and 70 all transmit information regarding the weight and quantity of the products passing thereby to a central location, where a totalizing board may indicate the inventory according to the nature and weight range of the product. Inventory may concurrently be maintained on the number of chucks and rounds and on the number and weight of each type of boxed product by automatically counting and weighing the products entering and leaving the refrigerated storage areas.

Breaking of Carcass into Primal Cuts

As mentioned previously, present methods of subdividing a beef carcass into primal cuts involve substantial amount of manual handling of large bodies of meat and a relatively inefficient use of the saws and other devices used in their subdivision.

This invention, on the other hand, handles the carcass and some of its heavier subportions in a manner which eliminates all lifting and manual transferring of the meat. This is done by a series of conveyors which pass through cutting stations in a manner which permits the large bodies of meat to be supported by a conveyor after they are separated from the carcass. As used herein, the term "carcass" is intended to include an eviscerated and dressed animal or any subportion thereof such as sides or quarters which cannot conveniently be carried by an ordinary workman.

A diagrammatic illustration of the method and apparatus for reducing the carcass to primal portions is illustrated in FIG. 2, where initially a side of beef is supported on a conveyor 100 by a trolley 102 which carries the conventional gambrel 104. At an initial station, a worker inserts a cord 108 through the chuck. This is done by using a pointed awl 109 illustrated in FIG. 6 which is provided with an inclined notch 110 for receiving the cord. As used herein, the term "cord" is used to describe any strandlike material, either metallic or nonmetallic. Nylon cord is preferred. As illustrated in FIG. 6, this cord is inserted in a location where bones 112 will lie between the cord 108 and the line 114 where the chuck is to be severed from the forequarter. The inclination of the notch 110 in the awl 109 permits the awl to be withdrawn while leaving a loop extending on one side of the chuck.

Returning to FIG. 2, it will be seen that there is a preliminary cut 106 in the carcass at the boundary between the forequarter and hindquarter. Further movement of the side of beef on the conveyor rail 100 brings it to a station where a worker engages the forequarter F with a pair of tongs 116 having a pair of plates 118 which are movable into contacting engagement with the opposite sides of the forequarter. Details of the tong construction are described in a later portion of this specification.

The tongs 116 are carried by a conveyor rail 120 which supports the trolley 122 and the chain 124 which permits the tongs to swing laterally with respect to the conveyor rail 120 when engaging the forequarter of the side of beef supported on the rail 100. The trolley 122 is moved in synchronism with the trolley 102 on rail 100.

After the tongs 116 are firmly engaged with the forequarter F, the cut is completed to sever the forequarter from the hindquarter so that each will be supported on its respective conveyor rail 100 or 120.

Figure 3:
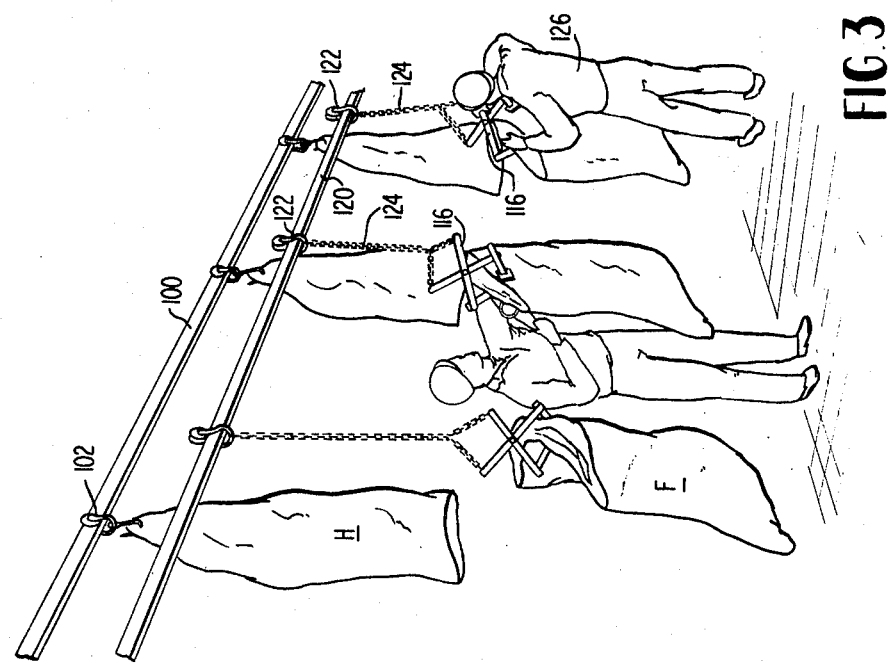
FIG. 3 illustrates that area of the beef-breaking facility where a forequarter of beef is supported by a pair of tongs as it is severed from a hindquarter.

The steps of applying the meat tongs to the forequarter and severing the forequarter from the suspended carcass are also shown in FIG. 3 where the worker 126 is shown in the process of placing the pair of tongs 116 on the forequarter. Once the tongs engage the opposite sides of the forequarter, the weight of the body of meat tends to bring the tongs into more secure engagement with the forequarter and enables the tongs adequately to support the forequarter through the chain 124 or other flexible elongated member which depends from the trolley 122 on the overhead rail 120. The flexibility of the chain 124 is particularly important since it permits the worker 126 to raise the tongs and move them downwardly until the chain 124 becomes taut, thus causing the tongs to engage the opposite sides of the forequarter. The worker 126 then uses a knife to complete the severance of the forequarter F from the hindquarter H.

Meat leaving the station illustrated in FIG. 3 includes the hindquarter H supported on the overhead conveyor 100 by a trolley 102, and the forequarter F supported by tongs 116 on the overhead conveyor rail 120.

As the forequarter continues its movement, an incision 132 is made between the chuck C and the remainder of the forequarter. Then, as seen in FIG. 7, the loose ends of the cord 108 are tied together in a double overhand knot 134 and the loop 136 is drawn upwardly so that the lower portion of the cord encircles both the meat and the bone 112 of the chuck. The presence of the bones will avoid tearing of the meat when the chuck is supported by the loop 136.

FIG. 4 shows the loop 126 being placed over a hook 138 which is supported on a trolley 140 on a rail 142. As illustrated in FIG. 4 the rail 142 is spaced horizontally and vertically from the rail 120 so that when the hook 138 is inserted in the loop 136 there will be a twisting or wrenching action in that area of the bodies which are still connected.

Once the loop 136 of the cord 108 is engaged over the hook 138, another cut may be made to separate the chuck from the forequarter as shown in FIG. 2. The shank may be left attached to the chuck or it may be dropped on the brisket-processing line. The chuck is routed to a work area where it is wrapped and then sent to a storage cooler. During all its movement, it may continue to be supported by the trolley 140 as it is moved through the network of handling, sorting, and storage rails.

The hindquarter and the remainder of the forequarter continue moving on their respective rails 100 and 120 through a series of subsequent stations where subportions such as primal cuts are removed therefrom by cutting, preferably by conventional power saws used in the butchering industry. These saws are suspended from retractable cables which relieve the operator from supporting the weight of the saw and permit him to move the saw to an elevation required to make the appropriate cut at his work station.

FIG. 2 shows movement of the hindquarter H to a first station where the flank is dropped at the head of a flank-processing line 144, and then to another cutting station where the loin L is cut and dropped at the head of the loin-processing line 146, leaving only the round L suspended from the gambrel 104 of the trolley 102.

The rounds and the chucks on their conveyor rails 100 and 142 are moved through a common area where they are wrapped in paper or knit stockinets and then passed along rails where they are weighed and sorted in the manner explained in connection with FIG. 1.

After removal of the chuck, the forequarter moves along the rail 120 through a series of subsequent processing stations where power saws are used to drop primal cuts into various processing lines. FIG. 2 shows the body of meat moving first to a station where the brisket B is cut and dropped onto the head of the brisket-processing line 148.

At a final station, the plate and rib are pulled by the conveyor and chain 124 onto a sawing table 147 which is high enough to permit the chain 124 to fall slack and the tongs to open. The plate P and rib are cut apart and pushed into chutes which lead to the heads of the plate-processing line 149 and rib-processing line 152.

Although there are many ways in which the conveyors may be organized for performing the operation illustrated in FIG. 2 it has been found advantageous and convenient to use a power and free conveyor system for the rails 100 and 142. In such systems, which are well known in the art, there are power sections in which driving dogs engage the trolleys 102 and 140 to move them positively along a power section of the rail. Typical power and free conveyor systems are shown by U.S. Pat. Nos. 1,921,109 and 2,510,318. At the end of the power section, the trolleys 102 and 140 may be released onto free or nonpowered rails where they may be moved manually or gravitationally by a slightly inclined rail. This arrangement is particularly convenient in handling the chucks and rounds since it permits them to remain on the same trolley throughout all steps of their processing and storage. In the arrangement disclosed in FIG. 2, there is no necessity for releasing the trolleys 122 for free travel since the tongs 116 are empty at the end of their line. Therefore, a conventional chain-driven power conveyor may be used in connection with the rail 120.

Preferably, movement of the trolleys 102, 122 and 140 are synchronized and they are moved through the various cutting stations in a same direction and at a constant and equal velocity. In the stations where the forequarter is cut from the hindquarter and the chuck is cut from the forequarter, the involved conveyor rail should be parallel.

Another practical consideration involves the efficient utilization of floor space and, in this connection, it has been found desirable to arrange the conveyors so that the rail 120 is horizontally spaced between the rails 100 and 142. This permits the tongs 116 to swing in one direction along the chain 124 when removing the forequarter from the side of beef and then to swing in an opposite direction when removing the chuck from the forequarter.

It is also desirable to have an elevated rail and cutting saw at the stations where the flank, loin, brisket, plate and rib are removed so that the workers performing the operation may release the primal cuts onto chutes which discharge to the head of the appropriate processing line. This removes the workers from the immediate vicinity of those who are stationed along the processing lines.

Primal Cut Processing Lines

In the processing lines which are represented diagrammatically at 6 in FIG. 1, the primal cuts are divided into consumer cuts, boned, trimmed, packaged, weighed, and sorted according to weight and then placed in boxes. Some products do not require wrapping or others of the steps, so their processing lines may be modified accordingly. Generally, each of the processing lines includes a main conveyor which may comprise a stainless steel belt of a type commonly used by large-scale meat purveyors. A number of secondary belt conveyors are arranged parallel and adjacent to the main conveyor and may carry various types of secondary cuts, bones, trim, and fat from the work stations along the main conveyor.

A somewhat abbreviated and foreshortened illustration of the loin-processing line is shown in FIG. 5 where the main belt 154 is located to receive the loin from the cutting station 156 by means of a chute (not shown).

The initial operation on the loin is to remove the tenderloin, and this is done at the work areas 158 located along the main conveyor 154. The tenderloin is then placed on a separate conveyor (not shown) which is parallel to the main conveyor 154, which then carries the tenderloin to a branch processing line where it is trimmed, wrapped, weighed and boxed. After removal of the tenderloin, the loin is first split at the saw tables 160, and then sawed at the saw tables 161 to remove the chine bone from the shell. The meat resumes its movement and is operated on at the cutting tables 163 to remove the finger bone from the loin and to bone the head loin. The bottom butt and the New York strip are placed on individual conveyors which lead them to branch processing lines. The top butt continues on the main conveyor 154 until it is transferred onto the top butt trimming conveyor 164 which has a number of cutting tables 166 where workers may perform the necessary trimming operations. The cutting tables 158 and 166, as well as the saw tables 160 and 161, are at a same height as the adjacent belt conveyor so that the necessity for workers to lift the portions of meat is eliminated throughout the entire system.

After being trimmed, the top butts go through an area 168 where they are placed within thermoplastic heat-shrinkable bags before they are carried along a transfer conveyor 170 to the areas 172 where operators are provided with mechanisms for evacuating the bags and sealing them by stapling or other means. The bags then go through a shrink tunnel 174 where they pass through a curtain of hot liquid, thus contracting the bag into close engagement with the meat to ensure that the meat will remain fresh. A transfer conveyor 176 leads the wrapped product to a weighing machine 178 of the type described and illustrated in U.S. Pat. No. 3,093,245 to Leslie E. Worchester, et al. Such weighing machines weigh the product and then divert it along any one of the three paths 180 in accordance with its weight. Usually, the central path 180 will carry products falling within a predetermined weight range, while the paths to the left and right are used for articles falling above and below the predetermined weight range.

After being sorted by the machine 178, the products fall into pockets 182. A worker then transfers the products into the waiting boxes 184. In this manner, each box is filled with a group of consumer cuts of a given type falling within a given weight range. When the boxes are filled, they may be transferred by the worker onto the boxed products conveyor line 10 which also is represented in FIG. 1. The conveyor 10 is preferably directly below the pockets 182 so the boxes may be moved laterally onto the conveyor to avoid unnecessary lifting of the boxes.

As discussed in connection with FIG. 1, each of the boxes is provided with machine-readable markings which may be indicative of both the particular type of cut contained in the box and the weight range of those cuts in the box. This indicia may comprise a pattern of reflective pieces of tape on the box. Referring to FIG. 8, it will be noted that the box includes, on its end panel 189, a printed series of squares 185. The operator who transfers the pieces of meat from the pockets 182 of the weighing machine 178 to the boxes 184 at the end of the processing line shown in FIG. 5 is provided with a supply of reflective tape, pieces of which are placed in the appropriate squares to indicate the nature of the group of products enclosed within that box. The boxes are made of corrugated paper and include an interior panel 187 which is parallel to and behind the end panel 189 so that the products will not be contaminated by persons who lift the boxes by the handhold openings 191. The term "box" is intended to encompass receptacles and containers of various shapes and materials.

As mentioned briefly above, the loin-processing line includes branch conveyors for the processing of the bottom butts, New York strips, and the tenderloins. The bottom butts are trimmed, the tri tips and flaps are each placed on individual conveyors and all are routed to a boxing station without further wrapping or weighing. The New York strips and the tenderloins are processed along lines substantially the same as the one illustrated for the top butt in FIG. 5.

The other primal cuts which are fed along processing lines where they are further subdivided, trimmed or boned are the flank, brisket, plate and rib.

The flanks may simply be trimmed to remove the excess fat and then placed in boxes having suitable machine-readable markings. These boxes are then sealed, sorted, palletized and otherwise handled in the same manner as the consumer cuts from the loin described above.

The briskets pass along a stainless steel belt conveyor where they are boned and trimmed, sorted into groups according to their weight using an automatic machine, and then placed in boxes like the one illustrated in FIG. 8.

The processing of the plate is done alongside a main plate conveyor which lies adjacent to a series of parallel conveyors designed to carry the pastrami, skirt steaks, and kosher short ribs. The procedure along the main plate conveyor includes the steps of pulling the skirt steak and placing it on its individual conveyor, cutting the kosher short rib and placing it on its individual conveyor, boning the plate, and pulling the pastrami and placing it on its individual conveyor. At the end of this processing line, there is a station for boxing the kosher short ribs, a station for automatically sorting the pastrami into groups according to their weight range and boxing them in groups, and stations for boxing the skirt steaks. All of the boxed products are then routed on conveyors to the subsequent handling operations illustrated diagrammatically in FIG. 1.

The rib which is released from the tongs as illustrated in FIG. 2 falls at the head of a rib-processing line, alongside of which are a series of table saws for sawing the short rib and the chine bone. The short ribs then move along a branch conveyor where they are trimmed and boxed. The O.P. ribs are tied in a conventional manner and then wrapped in heat-shrinkable bags in the same manner described above in connection with the top butts.

Important and desirable adjuncts of a processing facility of this magnitude are the bone removal conveyors, the trim removal conveyors, and the box assembling and supplying facilities.

The bones move first from the individual processing lines to a centralized area where they are advanced on a conveyor along a series of work stations provided with Whizzard knives of the type conventionally used for removing edible meat from bones.

The trim which includes fat and some edible meat is a salable product which may be used for making animal foods, sausages, and for other purposes. It is taken initially from work stations along the processing lines by belt conveyors which form a network throughout the entire facility. These conveyors are reversible and may be arranged to route the trim to any of several collection points or to a single collection point. At each collection point, there is a boxing station for the trim. This arrangement has proven to be particularly suitable since some purchasers of trim require a blending thereof so that it includes the trim from only certain portions of the animal. By adjusting the direction of movement of the various conveyors to route the trim from specified processing lines to designated collection points, such blending may be easily accomplished.

At the end of each processing line, there is a station where the products are placed in boxes. Boxes are supplied to the stations by chutes which lead from a box-forming area above the main meat-processing floor. In the box-forming area, there are a number of parallel lanes of flat box blanks which lead to box-assembly machines of the type generally shown in U.S. Pat. No. 3,218,940 of Reinhold A. Pearson. A single machine of this type may be used to serve several lanes of flat box blanks by having the machines mounted for movement on a rail which runs perpendicular to the lanes so that the machine may be aligned with a particular lane.

The box-forming machine folds the boxes into their upright condition and discharges them to a box supply conveyor, one conveyor being provided for each type of box used in the operation. This conveyor may be a belt conveyor which elevates the boxes to the entry of a gravity conveyor leading to the box supply chutes. With this arrangement, all the boxing stations on the processing floor are adequately supplied with empty boxes.

Tong Construction

The tongs which may be used to support the forequarter during the sequence of steps illustrated in FIG. 2 are shown in FIGS. 9—12. They may be equally useful in handling any other large bodies of meat. The tongs are supported on a conveyor rail 120 by a trolley 122 which is driven by a continuous chain (not shown). A chain 124 connects the tongs 116 to the trolley and permits them to be swung laterally during the operations shown in FIGS. 3 and 4.

The tongs themselves include a pair of arms 200 which are pivotally connected at 202 and have their upper ends supported by the flexible chains 204 which connect to the suspending chain 124 at a ring 206.

The lower ends of the arms 200 have extensions 208 which carry the meat-engaging plates 118. There is also an upwardly directed spike 201 on one of the arms 200 which may be used to carry primal cuts or other loose bodies of meat.

FIGS. 10—12 show the preferred construction of the plates 118. They are relatively flat and have their vertically extending marginal portions bent inwardly as shown in FIG. 11 to provide an edge surface 212 which contacts the meat. Preferably, each edge surface 212 is divided into a series of projections by locating notches 214 therealong as shown in FIGS. 10 and 12. The use of the plates 118 minimizes penetration of the meat by the tongs and therefore avoids any significant damage to the meat during its suspension by the tongs.

Each of the plates may also carry a single pointed member 216 which extends toward the opposite plate a distance substantially greater than do the projections of the edge 212. One of these pointed members is located on a lower portion of each plate and is offset to one side as shown in FIG. 12. They are also offset from each other.

It will be apparent from FIG. 9 that as the plates move in a downward direction, the linkages formed by the arms 200 and the chain sections 204 will bring the plate 118 against the opposite sides of a body of meat to support it securely from the conveyor rail 120 and trolley 122. An important purpose of the pointed members 216 is to assure initial engagement of the plates 118 with the meat so there will be some downward movement of the plates 118 when they are subjected to the weight of the meat. The pointed members 216 will penetrate and perhaps lie between some of the bones in the meat. Without the members 216, there is a possibility that the body of meat will slip from the tongs before being brought into sufficiently firm engagement with the plate 118 and the projections 212. This arrangement also simplifies the task of placing the tongs on the body of meat, and prevents the twisting of the suspended meat between the plates 118.

Discharge of Cord-Supported Meat from a Conveyor Hook

FIGS. 13 and 14 show a device capable of automatically releasing a chuck or other cord-supported body of meat from a conveyor hook 138.

The trolley 140 shown in FIG. 13 includes a trolley roller 250 supported on an axle 252 which passes through both sides of a trolley bracket 254. The hook 138 is supported on an eye rivet 256 which, in turn, is rotatably received in a horizontal flange 258 of the trolley bracket 254.

The trolley 140 follows a path between the two members 260 and 262 which are used to disengage the cord 108 from the hook 138. The member 260 is located on one side of the path taken by the hook 138 and is horizontally aligned with the shank portion of the hook at an elevation above the upturned end portion 264 of the hook. The other member 262 is located on an opposite side of the path taken by the hook 138 and is movable to a position below the hook, preferably against the cord 108 closely adjacent to the hook. The member 262 is carried at the end of an arm 266 which is pivotally mounted at 268 to a stationary support 270. A fluid-operated ram 272 is anchored at 274 to a stationary support and has its rod 276 pivotally connected at 278 to the arm 266. The ram 272 is connected to a source of fluid pressure which will operate in a usual manner to extend the rod 276 to move the arm 266 in a clockwise direction, thus bringing the member 262 against the cord 108.

Initially, the movement of the member 262 to the right when viewed from the position of FIG. 13 will cause the trolley 140 to incline slightly on the rail 280 so that the shank of the hook 138 will rest directly against the stationary member 260. In the event that the end portion 264 of the hook is pointing in any direction other than that shown in FIG. 13, the movement of the member 262 against the cord 108 will tend to turn the hook to the position shown in FIG. 13 to facilitate release of the cord 108 from the hook.

As the member 262 continues its movement and passes to the right and beyond the member 260, the cord 108 will be forced up the end portion 264 of the hook and the body of meat and the cord will be released.

A suitable and preferred location of the arrangement illustrated in FIGS. 13 and 14 is at the loading docks adjacent to the chuck conveyor 64 illustrated in FIG. 1. At this location, a belt conveyor may underlie the position where the meat is released, with the discharge end of the belt conveyor lying within the load-carrying portion of the truck or other transport vehicle.

FIG. 14 shows the suspended body of meat moving toward the discharge station where it will be released by the coaction of the members 260 and 262 with the hook 138 and cord 108. The action of the ram 272 may be initiated by any suitable automatic sensing means which detects the presence of the trolley 140 between the members 260 and 262 at the unloading station.

This specification has dealt solely with preferred embodiments of the methods and apparatus used in a meat-processing plant. Many of the manipulative steps and elements are capable of use in other phases of a meat breaking, fabricating and handling operations. Throughout the specification and particularly in the claims which follow, the terms used are intended to be given their broadest interpretation considered in light of the present state of the art.

We claim:

1. The method of subdividing an eviscerated and dressed animal carcass such as a side of beef comprising the steps of suspending the carcass from a first supporting device on a conveyor, moving the carcass to a first cutting station and engaging a first portion which includes a plurality of primal cuts of the carcass with a second supporting device suspended from a conveyor, cutting said first portion from the carcass to permit the weight of said first portion to be borne by said second supporting device. While leaving a second portion which includes a plurality of primal cuts of the carcass suspended from said first supporting device, said first portion having different types of primal cuts from said second portion, moving said first and second portions of the carcass on conveyors through different paths and different series of subsequent stations.

2. The method according to claim 1 applied specifically to beef, wherein the cutting step at the first cutting station separates a forequarter from a hindquarter.

3. The method according to claim 2 including additional cutting steps at the subsequent stations to remove primal cuts from the quarters.

4. The method according to claim 2 in which the step of engaging the first portion of the carcass includes the step of moving a pair of opposed gripping surfaces toward each other and at least into contact with opposite sides of the first portion.

5. The method according to claim 1 including additional cutting steps upon the portions at the subsequent stations to remove subportions therefrom.

6. The method according to claim 5 including the steps of moving at least some of the removed subportions along further paths originating at their respective subsequent stations, and removing bones and fat from the subportions at stations along said further paths.

7. The method according to claim 5 as applied specifically to subdividing a beef carcass, wherein the additional cutting steps at the subsequent stations remove primal cuts from the portions.

8. The method according to claim 5 as applied to a plurality of carcass wherein the carcasses and portions thereof are moved at a constant velocity along their paths through all of said cutting stations.

9. The method according to claim 5 including the step of inserting a cord through a subportion and forming a loop in the cord, and engaging the loop with a supporting device prior to removal of the subportion from its respective portion.

10. The method according to claim 1 wherein the first and second supporting devices are moved in a same direction and at an equal velocity during the cutting step at the first cutting station.

11. The method according to claim 10 wherein the first and second supporting devices are moved along substantially parallel spaced apart paths during the cutting step at the first cutting station.

12. The method according to claim 11 including additional cutting steps upon the portions at the subsequent stations to remove subportions therefrom.

13. The method according to claim 1 wherein the step of engaging the first portion of the carcass involves moving a cooperating pair of opposed gripping surfaces of the second supporting device toward each other and at least into contact with opposite sides of the first portion of the carcass.

14. The method according to claim 1 wherein the first and second supporting devices are moved through the first cutting station along substantially parallel spaced-apart paths.

15. The method of subdividing an eviscerated and dressed beef carcass in an integrated system comprising the steps of moving the carcass to a first cutting station, cutting the carcass into fore and hind sections at the first cutting station, moving each of said sections through a different path each of which includes a different series of spaced apart subsequent cutting stations, and cutting said sections at each of said subsequent cutting stations to remove primal cuts therefrom.

16. The method of claim 15 as applied to a plurality of said carcasses in which the carcasses and sections thereof are moved at a constant velocity through all cutting stations.

17. The method of claim 16 including the step of engaging one section with a suspended support before the cutting step at the first cutting station by moving a cooperating pair of opposed gripping surfaces toward each other and at least into contact with opposite sides of the section.

18. The method of claim 16 including the steps of inserting a cord through one primal cut and forming a loop in the cord, engaging said loop with a support, wherein the cutting step at one of the subsequent cutting stations involves cutting said one primal cut from its respective section and suspending said one primal cut from the support.

19. The method of claim 15 including the steps of inserting a cord through one primal cut and forming a loop in the cord, engaging said loop with a support prior to cutting the one primal cut from its section, and suspending said one primal cut from the support.

20. The method of claim 15 including the step of engaging a section with a suspended support prior to cutting it from the carcass, said engaging step including moving a cooperating pair of opposed gripping surfaces toward each other and at least into contact with opposite sides of the section.

21. The method of breaking an eviscerated and dressed livestock carcass such as a side of beef comprising the steps of suspending the carcass from a conveyor, moving the carcass on the conveyor through a plurality of spaced apart cutting stations and cutting the suspended carcass at the cutting stations to remove therefrom portions which include meat, bones and fat while the remainder of the carcass remains suspended.

22. The method according to claim 21 including the steps of moving said portions from said cutting stations along further conveyors, and cutting, trimming and boning the portions at stations located along the further conveyors.

23. The method according to claim 21 wherein the cutting steps at the cutting stations remove primal cuts from the suspended carcass.

24. The method according to claim 21 including the step of suspending a portion from a support during the cutting step at its removal from the carcass at its respective cutting station.

25. The method according to claim 24 wherein said portion is suspended from a support by engaging the portion by moving a cooperating pair of opposed gripping surfaces toward each other and at least into contact with opposite sides of the portion.

26. The method according to claim 24 including the step of inserting a cord through the portion and forming a loop in the cord and the step of suspending the portion includes placing of the loop over a support.

27. The method according to claim 24 as applied to a plurality of carcasses in which the carcasses and portions thereof are moved at a constant velocity through said cutting stations.

28. The method of subdividing an animal carcass such as a side of beef comprising the steps of suspending the carcass from a support on a first power conveyor, moving the carcass to a first station and engaging a first portion of the carcass with a device suspended from a support on a second conveyor, cutting said first portion from the carcass to permit the weight of said first portion to be borne by said second conveyor while leaving a second portion of the carcass suspended form said first conveyor, continuing the movement of both portions on their respective conveyors under power, and then performing further cutting steps upon the portions to remove subportions therefrom while they are supported on their respective conveyors.

29. The method according to claim 28 applied specifically to a side of beef, wherein the cutting step separates a forequarter from a hindquarter.

30. The method according to claim 29 wherein the further cutting steps remove primal cuts from the quarters.

31. The method according to claim 28 including the steps of moving the removed subportions of each type along a given path, and removing bones and fat therefrom at stations along said path.

32. The method of claim 28 in which the step of engaging a first portion of the carcass includes the step of moving a cooperating pair of opposed gripping surfaces which are connected to the second conveyor toward each other and at least into contact with opposite sides of the first portion.

33. The method of claim 28 in which the step of engaging the first portion of the carcass includes the steps of inserting a cord therethrough and forming a loop in the cord, and engaging the loop with the support on the second conveyor.

34. The method of claim 28 wherein the supports on both conveyors are moved under power during the cutting step.

35. The method of removing a portion of meat from a larger body of meat which is suspended from a support, comprising the steps of engaging the portion with a suspended gripping device by moving opposed portions of the gripping device toward each other and at least into contact with opposite sides of the portion, and cutting said portion from said larger body.

36. The method according to claim 35 in which the said opposed portions of the gripping device are moved to project into opposite sides of the portion of meat, wherein such movement of the opposed portions is arrested prior to their complete passage through the thickness of the portion of meat.

37. The method of claim 36 including the step of moving the larger body of meat and the gripping device at a same velocity and in a same direction having a substantial horizontal component during said cutting step.

38. The method of claim 36 including the step of moving the portion and the remainder of the larger body after said cutting step through different series of subsequent stations, and working on the portions at the subsequent stations while they remain suspended.

39. The method of claim 38 including the step of cutting the portions at the subsequent stations to remove segments thereof.

40. The method of removing a portion of meat from a larger body of meat which is suspended from a first support, comprising the steps of inserting a cord through the portion and forming a loop in the cord; engaging the loop with a second support; and cutting the portion from the larger body so that the weight of the portion will be borne by the second support.

41. The method of claim 40 including the step of moving the first support and the second support at a same velocity and in a same direction having a substantial horizontal component during the cutting step.

42. The method of claim 40 including manipulation of the products of the cutting step by moving the portion and the remainder of the larger body after said cutting step through different series of subsequent stations, and working on the portions at the subsequent stations while they remain suspended.

43. The method of claim 40 as applied specifically to beef, wherein the cutting step removes the chuck which constitutes the portion.

44. The method of claim 35 wherein the gripping devices is suspended from a flexible elongated member, including the step of moving the opposed portions of the gripping device downwardly during their movement into contact with opposite sides of the portion.